Nov. 10, 1942.    C. I. McNEIL    2,301,434
INTERNAL COMBUSTION ENGINES
Filed Dec. 30, 1936
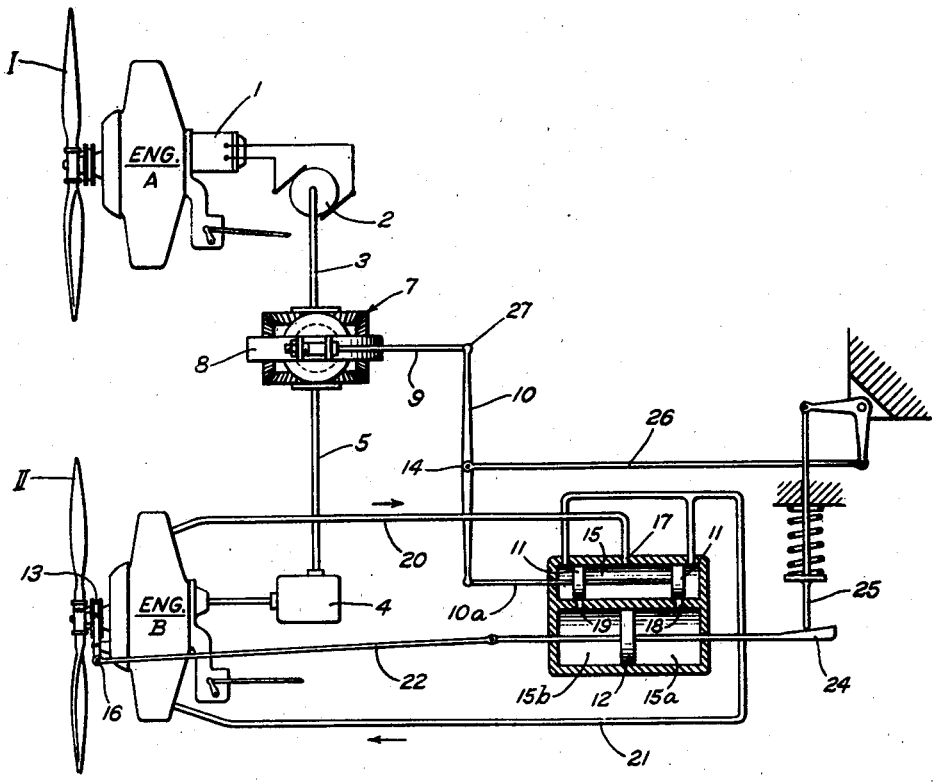
INVENTOR.
Charles I. McNeil
BY
Martin J. Finnegan
ATTORNEY.

UNITED STATES PATENT OFFICE 2,301,434

INTERNAL COMBUSTION ENGINES

Charles I. McNeil, East Orange, N. J., assignor, by mesne assignments, to Bendix Aviation Corporation, South Bend, Ind., a corporation of Delaware Application December 30, 1936, Serial No. 119,094

3 Claims. (Cl. 60—97)

This invention relates to the control of the angular velocity of a rotating member or members. More particularly, the invention relates to a method and mechanism for controlling the propellers of a multi-motored aircraft to maintain them in synchronous rotation, the control being operative upon the said propellers to change the blade pitch and thus restore synchronism following a temporary deviation therefrom.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Of the drawing:

The single figure is a partially diagrammatic or schematic showing in plan of a preferred embodiment of the invention, showing its application to the propellers of a two-motor airplane.

The invention provides a novel and useful method and mechanism for controlling or governing the angular velocity or rotation of a rotating member or members, such as variable pitch propeller blades, fan blades, screw propellers such as used on water craft, or any other mechanisms which have rotary motion or a motion which can be converted into rotation for the purposes of such control. The invention is further directed to a novel and useful method and mechanism for correcting temporary variations in angular velocity between two rotating members.

The novel method of the invention broadly comprises detecting and determining the differences between the rotary speed of a master or standard rotating member and that of the member or members to be controlled, and automatically varying the pitch of the latter so as to eliminate such differences.

One object of the invention is to provide a method and means for accurately determining the actual differences in rotary velocity of two rotating members and utilizing the determined differences for automatic governing of said member or members.

By virtue of the present invention it is possible to automatically maintain any number of variable pitch propellers in synchronized rotation, either at the same R. P. M., or at any predetermined and variable ratio of angular velocities.

Preferably, a master control shaft driven by or connected to rotate proportionately to the master motor, and a shaft driven by or rotating proportionately to the motor to be governed are connected by differential gearing. The housing or other portion of the differential gearing which normally idles in mesh with the driven gears is adapted to move proportionately to the differences in rotation between the master control shaft and the governed shaft. These movements of the differential housing are automatically transmitted to the propeller hub or other speed-control mechanism of the governed propeller so as to vary the pitch of the latter and accordingly change its speed to bring the gears of the differential into synchronism.

Referring now in detail to the present embodiment of the invention, illustrated by way of example, in the accompanying drawing, the invention provides a unit controlling or synchronizing device which automatically detects and measures differences between the angular velocity of the standard or master rotating body or propeller I and the member or propeller II to be controlled. As embodied, the unit synchronizing device comprises an epicyclic gear train, preferably arranged in the form of a bevel gear differential 7 although other forms of epicyclic gearing and differentials may be used. The arrangement of the differential gearing is such that one gear rotates with or is driven from the master or standard rotating body A, a second gear being driven in the opposite direction from the body or motor B, while a third element of the gear train, in accordance with the principles of differential gearing, normally idles in mesh with the other two driven gears and moves proportionately to the differences in the angular velocities thereof.

This movement is transmitted to a sliding valve 11 of a servo-motor, which actuates a yoke and linkage combination shown at 13 and 16, to shift the setting of variable pitch propeller II of the engine B to be brought into synchronism with propeller I of engine A.

A small alternating current generator 1 driven by engine A drives a small synchronous motor 2 causing its shaft 3 to revolve with a speed which is always proportional to the speed of engine A. Engine B drives a gear box unit 4 by a direct mechanical drive which causes shaft 5 to rotate with a speed which is always proportional to the speed of engine B. The gear reduction in the synchronous motor 2 and the gear box 4 are so chosen that when propellers I and II are exactly in synchronism shafts 3 and 5 will be revolving with exactly the same speeds but in opposite directions. This means that when propellers I and II are in synchronism the cage holding the pinions of differential 7 will remain motionless. Should the engine speed vary due to the propellers going out of synchronism the cage will immediately start to revolve, its direction of rotation depending upon which engine is rotating the faster. The motion of the case is transmitted through clutch 8 to rod 9 which in turn moves lever 10 about its fulcrum 14 and rod 10a, thereby displacing valve 11 to the right from the neutral position shown, and allowing communication to be established between the chambers 15 and 15a of the servo-motor, and the pressure circulated oil conduit 20 of engine B, by way of ports 17 and 18. The resulting pressure increase in chamber 15a, in conjunction with the simultaneous discharge of oil from chamber 15b (by way of port 19 and oil return conduit 21) will cause piston 12 to move to the left and thereby move rod 22 and linkage 16 to cause yoke 13 to be shifted and likewise the propeller blades to change their pitch, the yoke and blade shifting construction being as more fully illustrated and described in Patent No. 1,852,499 granted to John Rapp Zipay on April 5, 1932. Thus the motion of piston 12 is a "servo" motion controlled by differential 7, while the "follow-up" action of valve 11 is brought about by the action of cam 24 upon the spring restrained follower 25 and linkage 26, the latter connecting with lever 10 to swing the said lever about its upper pivot 27 as a fulcrum, and thereby restore valve 11 to its normal, or "cut-off" position, as shown. An example of operation in an aircraft installation is as follows:

If the two propellers are not exactly in synchronism the cage of differential 7 acts through the clutch 8 and servo mechanism 11, 12 to cause linkage 16 to move slightly, thereby adjusting the pitch of propeller blades of engine B. This adjusting motion will vary the "thrust," hence the load, on propeller II with a resultant variation in speed of the engine B. This variation will continue to the point where the differential cage ceases to move, the valve 11 being meanwhile restored to the position wherein linkage 16 will likewise cease its motion. The cycle is thus completed and synchronism restored.

Clutch 8 is provided to prevent damage to any part of the system, should for any reason, the propellers not synchronize. When rod 9 reaches the end of its stroke, if the propellers are not synchronized, the differential cage continues to move but clutch 8 slips, preventing damage.

Another alternating current generator and synchronous motor could be substituted for the mechanical drive and gear box 4 if it is so desired, but the direct drive is usually the lighter.

What is claimed is:

1. In combination with an internal combustion engine, a second internal combustion engine associated therewith, means including a piston operatively connected to said first-named engine to vary the speed thereof, means for causing movement of said piston, said means comprising a valve adjacent said piston, a cylinder housing said piston and valve, fluid flow connections between said engine and cylinder, through which connections oil pumped by said engine is caused to flow whenever said valve is shifted from neutral position, a gear train having members drivably connected with each of said engines, a third member responsive to the speed differential therebetween to shift said valve, and follow-up means shiftable by said piston to return said valve to the position occupied prior to said speed variation, said follow-up means being operable independently of any motion of said third member of said gear train.

2. In combination with an internal combustion engine, a second internal combustion engine associated therewith, means including a piston operatively connected to said first-named engine to vary the speed thereof, means for causing movement of said piston, said means comprising a valve adjacent said piston, a cylinder housing said piston and valve, fluid flow connections between said engine and cylinder, through which connections oil pumped by said engine is caused to flow whenever said valve is shifted from neutral position, a gear train having members drivably connected with each of said engines, and a third member responsive to the speed differential therebetween to shift said valve.

3. In combination with an internal combustion engine, a second internal combustion engine associated therewith, means including a piston operatively connected to said first-named engine to vary the speed thereof, means for causing movement of said piston, said means comprising a valve adjacent said piston, a cylinder housing said piston and valve, fluid flow connections between said engine and cylinder, through which connections oil pumped by said engine is caused to flow whenever said valve is shifted from neutral position, a differential mechanism having members drivably connected with each of said engines, and a third member responsibe to the speed differential therebetween to shift said valve.

CHARLES I. McNEIL.